United States Patent [19]

Frey et al.

[11] Patent Number: 5,023,848
[45] Date of Patent: Jun. 11, 1991

[54] SOLDER WAVE DWELL TIMER

[75] Inventors: Eric M. Frey; Joseph A. Lamb, both of Tucson, Ariz.

[73] Assignee: Highes Aircraft Company, Los Angeles, Calif.

[21] Appl. No.: 351,753

[22] Filed: May 15, 1989

[51] Int. Cl.⁵ .............................................. G04F 08/00
[52] U.S. Cl. ......................................... 368/1; 368/10; 368/70; 368/107
[58] Field of Search .................... 368/1, 10; 228/8, 9, 228/10

[56] References Cited

U.S. PATENT DOCUMENTS

| | | | |
|---|---|---|---|
| 2,660,057 | 11/1953 | Ackley | 368/1 |
| 4,180,199 | 12/1979 | O'Rourke et al. | 228/9 |
| 4,421,417 | 12/1983 | McQuade | 368/1 |
| 4,632,291 | 12/1986 | Rahn et al. | 228/9 |

FOREIGN PATENT DOCUMENTS

| | | | |
|---|---|---|---|
| 337739 | 1/1964 | Canada | 368/1 |
| 2089075 | 6/1982 | United Kingdom | 368/1 |

Primary Examiner—Bernard Roskoski
Attorney, Agent, or Firm—R. M. Heald; C. D. Brown; W. K. Denson-Low

[57] ABSTRACT

A pair of spaced apart probes generally approximating the contact geometry of conveyed object to be wave soldered is similarly conveyed past and in contact with the solder wave. A timing circuit interconnects with the probes and measures the dwell time of the pair of probes in contact with the solder wave. The probes may have different shaped solder wave contacting parts (e.g., linear edge, points).

6 Claims, 3 Drawing Sheets

SOLDER WAVE DWELL TIMER

BACKGROUND OF THE INVENTION

1. Field of the Invention

The present invention relates generally to wave soldering apparatus and, more particularly, to a timer for measuring the solder contact time developed by the apparatus in soldering a device.

2. Description of Related Art

Where it is necessary to provide soldering of a large number of electrical, electronic components, subsystems or systems together such as on a printed circuit card, for example, it is impractical to attempt this by a point-to-point manual soldering technique. Instead, such large number of connections are soldered together by apparatus operating on what is referred to as a "wave" soldering principle. In a wave soldering machine, a printed circuit board to be soldered is moved by a conveyor through an enclosure on an inclined path past a fluxing station, a preheating station, and, finally, a station at which a wave of solder is caused to well upwardly and contact the various parts to be soldered. A very important wave soldering parameter for insuring efficient and reliable soldered connections is the dwell time of the devices to be soldered in the soldering wave.

In the past, the only technique known for measuring dwell time was by indirect means in which a wave "footprint" measurement device was used and a plot was developed from empirical data. Specifically, a glass plate having a set of grid lines of known dimensions is passed along the wave soldering machine conveyor and the contact of the solder wave is measured by the eye counting grid squares or lines of contact, for example. Then, it is a simple matter of calculating dwell time by multiplying the thickness of the wave as measured on the plate by 60 seconds per minute and dividing by the conveyor speed in inches per minute, for example. Although this technique is accurate, it leaves much to be desired in that for a number of different reasons the dwell time can change quickly during a run, for example, and also from day to day depending upon temperature variation in the solder, the change in composition of the solder, or other factors.

There is a further and undesirable effect termed "drag-out", that can result from the wetting ability of materials used and component lead configuration, in which the solder wave is pulled out of shape as the solder joints leave the wave. When this happens, the dwell time for certain joints will be significantly longer than for others. The glass plate is not wetted by the solder, and therefore, the known "footprint" technique does not indicate the presence of drag-out.

It is, therefore, desirable to be able to provide a solder dwell time measurement means which operates quickly, automatically, does not rely upon human observational techniques and calculations for achievement, and can exhibit the presence of drag-out.

SUMMARY OF THE DISCLOSURE

The wave solder dwell timer of the present invention includes an electronic timing module which is mounted onto a sensor card. The timer is driven by a timing integrated circuit with a timing pulse fed into a dual binary coded decimal up-down counter which, in turn, supplies timing signals to two decoder/display drivers. The output from the drivers powers two LED numeric character displays.

Contact probes, which optionally may be line contact or point contact, or any other pattern necessary to duplicate the pattern and distribution of the board or device in question, interconnect with the described timer through the solder wave as the timer apparatus is moved by the conveyor along the soldering path. Electrical actuation of the timer is achieved by the probes contacting the solder wave, with the circuit being completed through the solder wave, and, when the circuit is broken, this also provides the line of demarcation for completion of solder wave dwell time.

DESCRIPTION OF A PREFERRED EMBODIMENT

Figure 1:
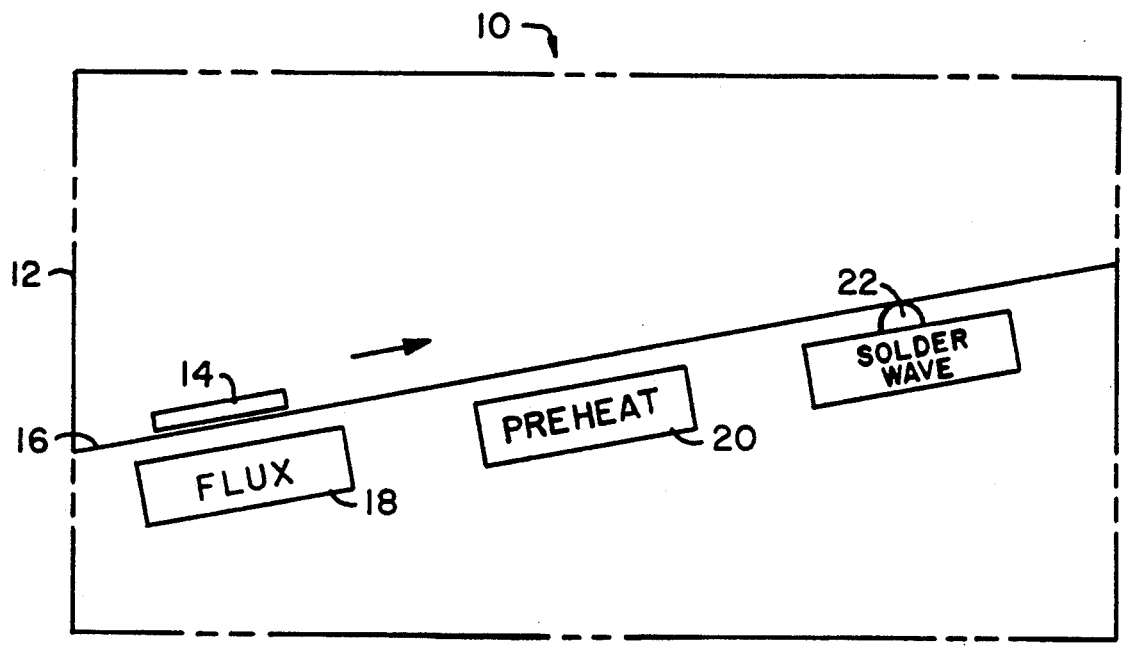
FIG. 1 is a schematic view of a typical wave solder apparatus with which the timer of the present invention can be usefully employed.

FIG. 1 shows wave soldering machine 10 in its general form which is typically employed for soldering such things as circuit board interconnections, for example. More particularly, such a wave soldering machine includes an enclosure 12 through which a circuit board 14 is moved on a generally upwardly extending path by a machine conveyor 16 past a first station 18 where solder flux is applied to those terminals or connection points to be soldered, through a preheat zone 20 where the fluxed circuit board is heated to an appropriately high temperature, and then a wave of solder 22 is caused to move upwardly to engage the lower surface of the circuit board moving therepast and effect soldering as desired. It is important to note that the constructional aspects of the wave solder machine can vary considerably and that the only thing needed for effective use of the described timer is the presence of the wave of solder 22.

It is a primary purpose of the present invention to provide a timer which identifies and precisely indicates the actual dwell time of the solderable leads in the solder wave as it engages a surface of the circuit board passing thereby. As indicated earlier, the dwell time is an important factor in determining the efficiency of soldering as well as its effectiveness.

In the past, measurement of solder wave dwell time was achieved by moving a glass sheet having surface grid marks thereon along the conveyor path onto and past the solder wave during which time the glass plate has its lower surface engaged by this solder wave. An individual can view the extent of contact and by knowing the speed of the conveyor and dimensions of the grid calculate the solder wave dwell time. Although this technique is somewhat effective, it is imprecise and requires the intrusion of an individual into the enclosure as well as requiring separate measurements and separate calculations by a viewing individual, all of which leaves much to be desired in the way of reliability and accuracy of determination, as well as repeatability of tests made.

Figure 2:
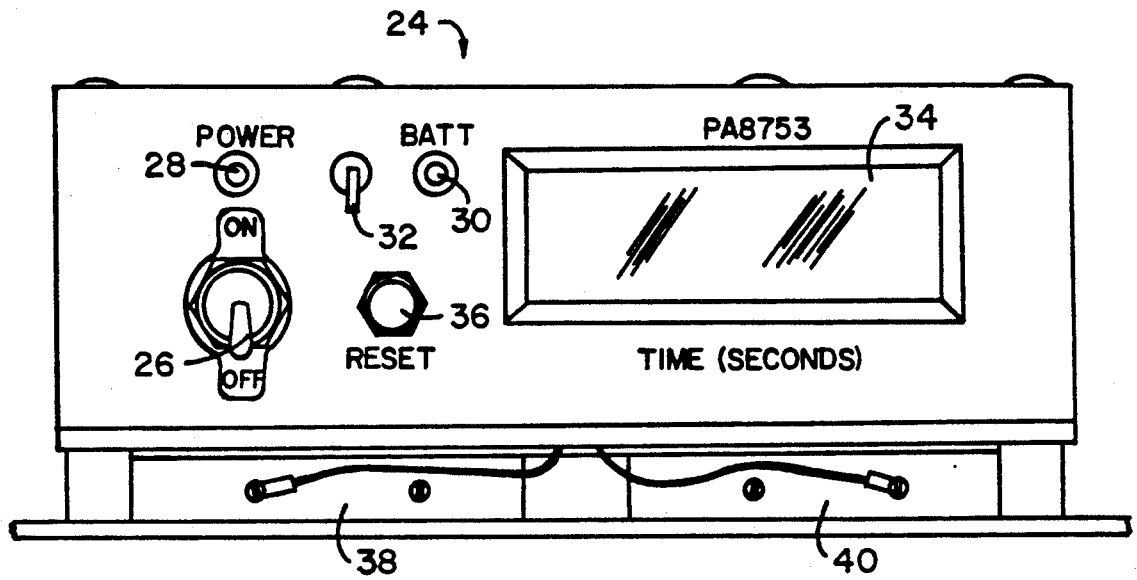
FIG. 2 is a side elevational view of the solder wave dwell timer of the present invention.
Figure 3:
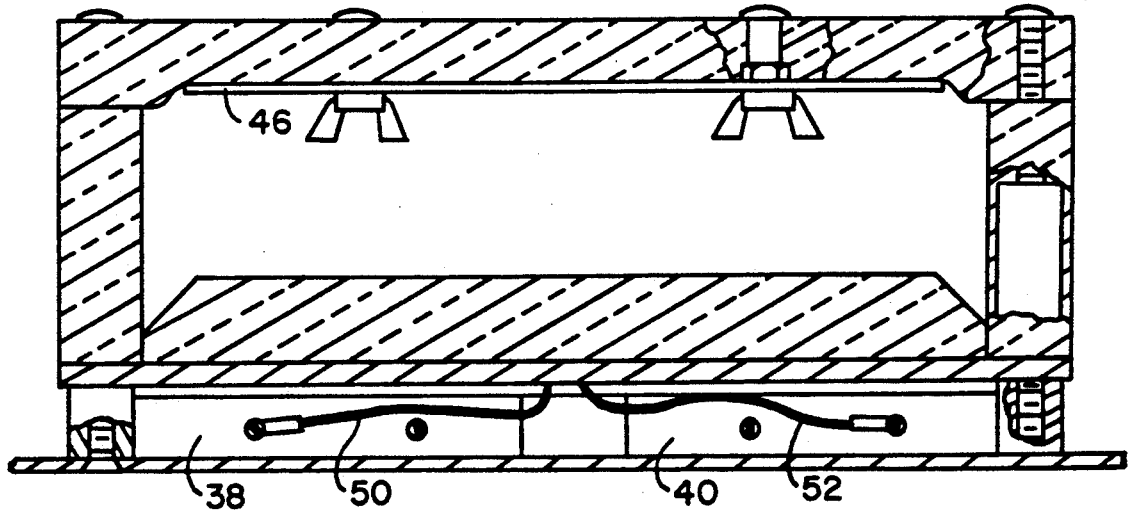
FIG. 3 is a sectional elevational view of the apparatus of FIG. 2.

Turning now particularly to FIGS. 1, 2 and 3, the timer apparatus 24 of this invention is seen to include a generally rectangular enclosure having on a side surface thereof an ON/OFF switch 26 closely adjacent to which is a rod light 28 that is illuminated when the switch 26 is in the ON position. A battery condition light 30 (green) turns "on" when the battery has sufficient power to operate the apparatus. A probe select switch 32 allows switching between point and line probes. A numerical display 34 provides, in a way that will be more particularly described, the actual dwell time for any particular test run and which display determinations will remain until affirmatively reset by depression of a reset button 36.

First and second plate-like probes 38 and 40 are secured to the lower front surface of the timer and as will be described during any test run their lower edges are brought into contact with a solder wave establishing through the solder wave itself an electrical energization circuit with the timer. The timer then begins to count elapsed time and continues the dwell time count until the circuit is broken between the two probes through the solder wave diminishing to a point where it cannot establish and maintain the interconnection. The probes 38 and 40 are made of identically shaped rectangular metal pieces and are referred to as "line" probes in that each probe contacts the solder wave along a straight line corresponding to a probe edge.

Figure 4A:
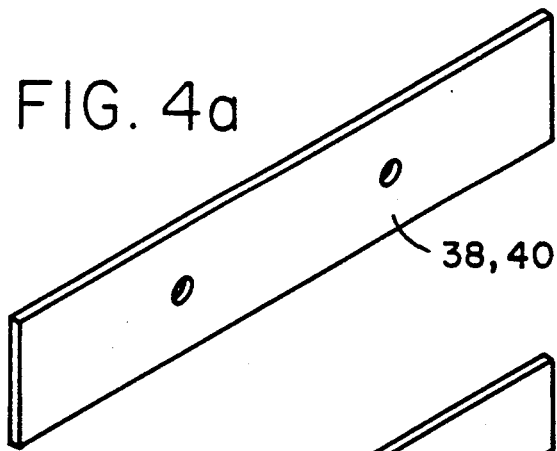
FIGS. 4A and 4B are perspective views of line contact and point contact probes, respectively.
Figure 4B:
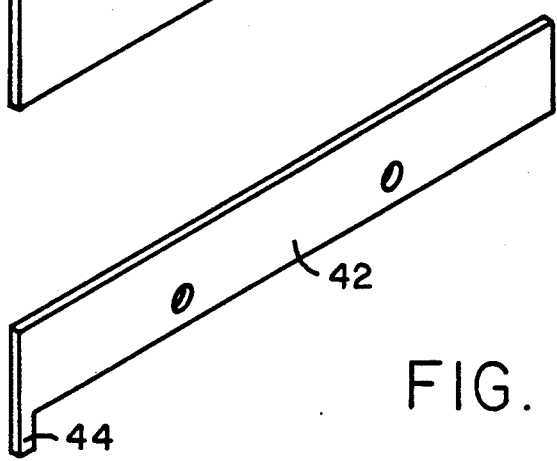

Alternatively, as shown in FIG. 4, what are termed point probes 42 can be used instead of the described line probes. More particularly, each point probe includes a generally rectangular metal plate similar to the line probe and differing in having a single thin metal finger 44 extending away from the lower edge to form a point contact. When the two point probes 42 are mounted on the lower edge of the timer, actual contact made with the solder wave will be by the two fingers of metal.

In actual practice the number and geometric arrangement of leads to be soldered can vary considerably. Accordingly, it is contemplated that different combinations and arrangements of point and line probes can be used with the described timer apparatus in order to achieve a proper test simulation for any circuit board or device.

As shown in the sectional view of FIG. 3, the timer housing 43 is hollow and includes circuit board 46 secured to the inner ceiling wall 45 by a pair of wing nuts 48. Housing 43 further includes a base wall 47, with stand-off legs 49 extending from base wall 47 into engagement with carrier board 51. Wires 50 and 52 interconnect the probes 38 and 40 of point probes 42, or a select combination of point and line probes to the circuit board.

Figure 5:
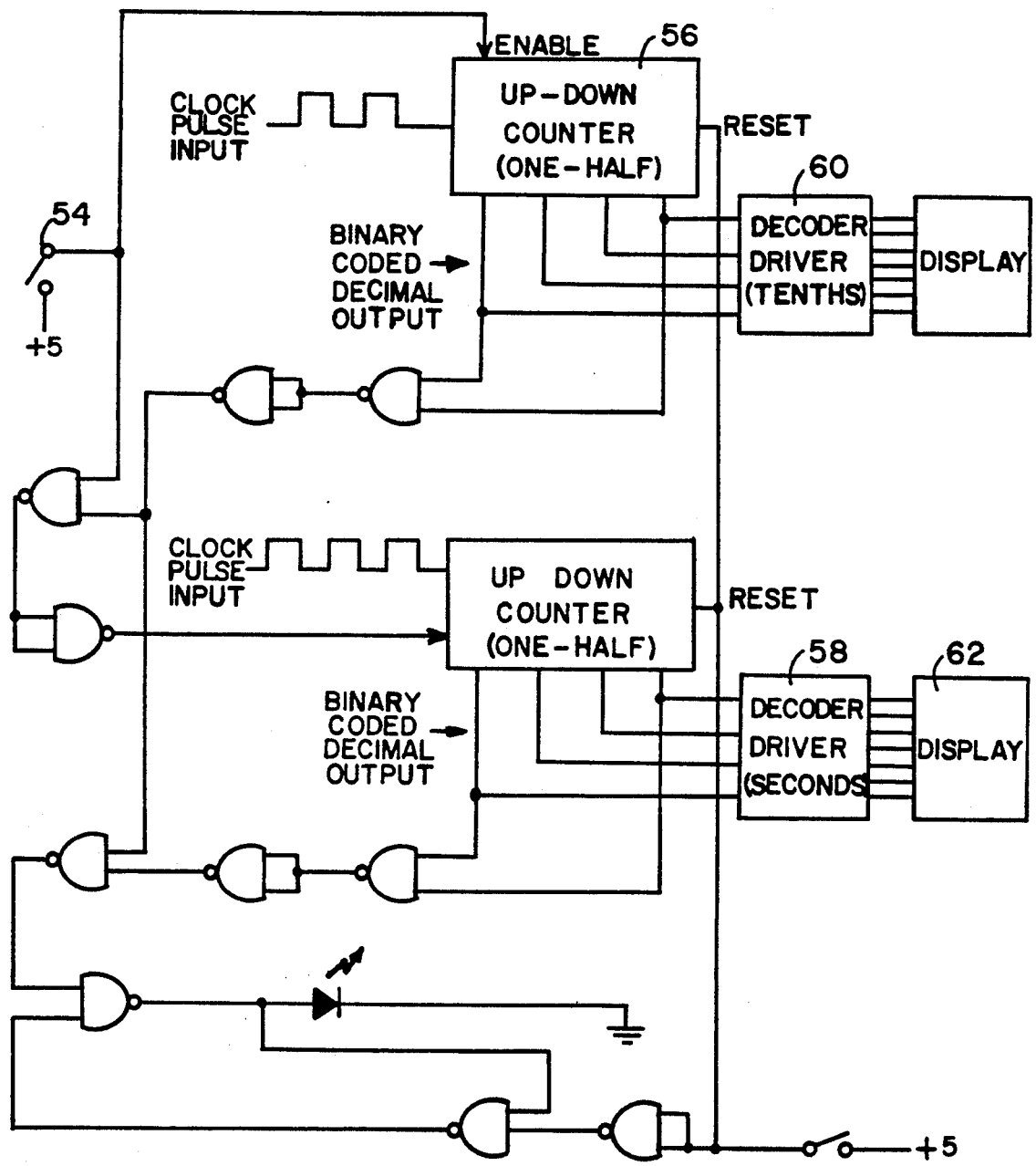
FIG. 5 is an electrical circuit schematic of the timer of the present invention.

For the ensuing description of the timer circuit, reference is now made to FIG. 5 where the two probes to be utilized with the timer, namely, the line probes or point probes, are shown as selectable by a switch 54, although in the usual case they may be fixedly mounted onto the timer housing and directly interconnected with the circuit board. Initiation of dwell time measurement is accomplished by the solder wave engaging the two probes and establishing an electrical circuit therebetween, i.e., closing of switch 54. When this happens, a signal is provided to the ENABLE terminal of an up-down counter 56, which for ease of presentation is shown in two halves. As long as the solder wave dwells on the probes, the clock pulse input will continue to impulse the counter. When the solder wave no longer establishes an interconnection between the probes, then the circuit is broken through the solder wave and probes which causes the counter 56 to cease accumulation with a registered timer count being that corresponding to the dwell time of the solder wave. The accumulated count is continuously fed out through decoder drivers 58 and 60 for representing a high digit or seconds display 62 and a low digit (tenths of seconds) display 64 in a way well known in the art. The time displayed will remain until reset button switch 36 is actuated to clear the counter.

In use of the described invention as shown in FIG. 1, the timer 24 and its attached carrier board 51 are placed on the solder machine conveyor 16 with the probes 38, 40 (or, optionally, 42) resting on the conveyor and aligned perpendicular with the direction of conveyor movement. When the timer is conveyed to the point of solder wave interception, the dwell time is measured in the manner already described. The measured dwell time remains displayed on the timer until reset by depression of RESET button 36.

The probes, whether of line or point contact variety, are so mounted on the timer apparatus housing as to be immersed in the solder wave to substantially the same extent as a device (e.g., lead) to be soldered. In this way, when coupled with proper selection of point and line probes, drag-out will be substantially the same as for an actual circuit being soldered and, therefore, detected and measured by the described apparatus.

The invention has been particularly described in connection with the use of a pair of point probes, a pair of line probes, or a combination of a point probe and a line probe. However, it is contemplated that the probes could be constructed of other geometries and still be within the spirit of the invention. Essentially, one aspect of this invention is to provide a probe shape approximating, even if only generally, the shape of a device to be soldered so that the "drag-out" (if any) will be the same and, therefore, dwell time measurements taken with probes will more accurately represent the actual dwell time of the device to be soldered.

Although the invention has been described in a preferred form, it is to be understood that one skilled in the appertaining art could utilize modified forms therein without departing from the spirit of the invention.

What is claimed is:

1. Apparatus for measuring dwell time within a solder wave of a device to be soldered which is carried by a conveyor past the solder wave comprising:
   a housing resting on a conveyor for joint movement therewith;
   a pair of spaced apart probes secured to the housing and extending beneath the conveyor in to contact with a solder wave; and
   timer circuit means mounted in the housing and connected to the probes for measuring the length of time both probes are in contact with the solder wave;
   said timer circuit means including an up-down counter having an output terminal and an enabling terminal connected to one probe, a further probe connected to an electric power source; decoder and driver means having an input and an output its input being connected to the counter output, with display means mounted in the housing and connected to the output of the decoder and driver means.

2. Apparatus as in claim 1, in which the probes each include a platelike body having a generally elongated edge which contacts the solder wave.

3. Apparatus as in claim 1, in which each probe includes an elongated finger with an outer end of substantially pointlike area which contacts the solder wave.

4. Apparatus as in claim 2, in which the elongated edge of each probe is immersed in the solder wave an extent corresponding to the amount of immersion of a device to be soldered by the solder wave.

5. Apparatus as in claim 3, in which the probe finger outer ends are immersed in the solder wave an amount corresponding to the amount of immersion of a device being soldered by the solder wave.

6. Apparatus as in claim 1, in which one probe has a finger with an end of pointlike area for contacting the solder wave, and the other probe has an elongated edge for contacting the solder wave.

* * * * *